Inventor
ARCHIBALD GRAHAM FORSYTH,
By Robert B. Larson
Attorney

Inventor
ARCHIBALD GRAHAM FORSYTH,
By Robert B. Larson
Attorney

June 21, 1949. A. G. FORSYTH 2,474,143
PROPULSION MEANS FOR AIRCRAFT AND THE LIKE
Filed July 13, 1944 7 Sheets-Sheet 6
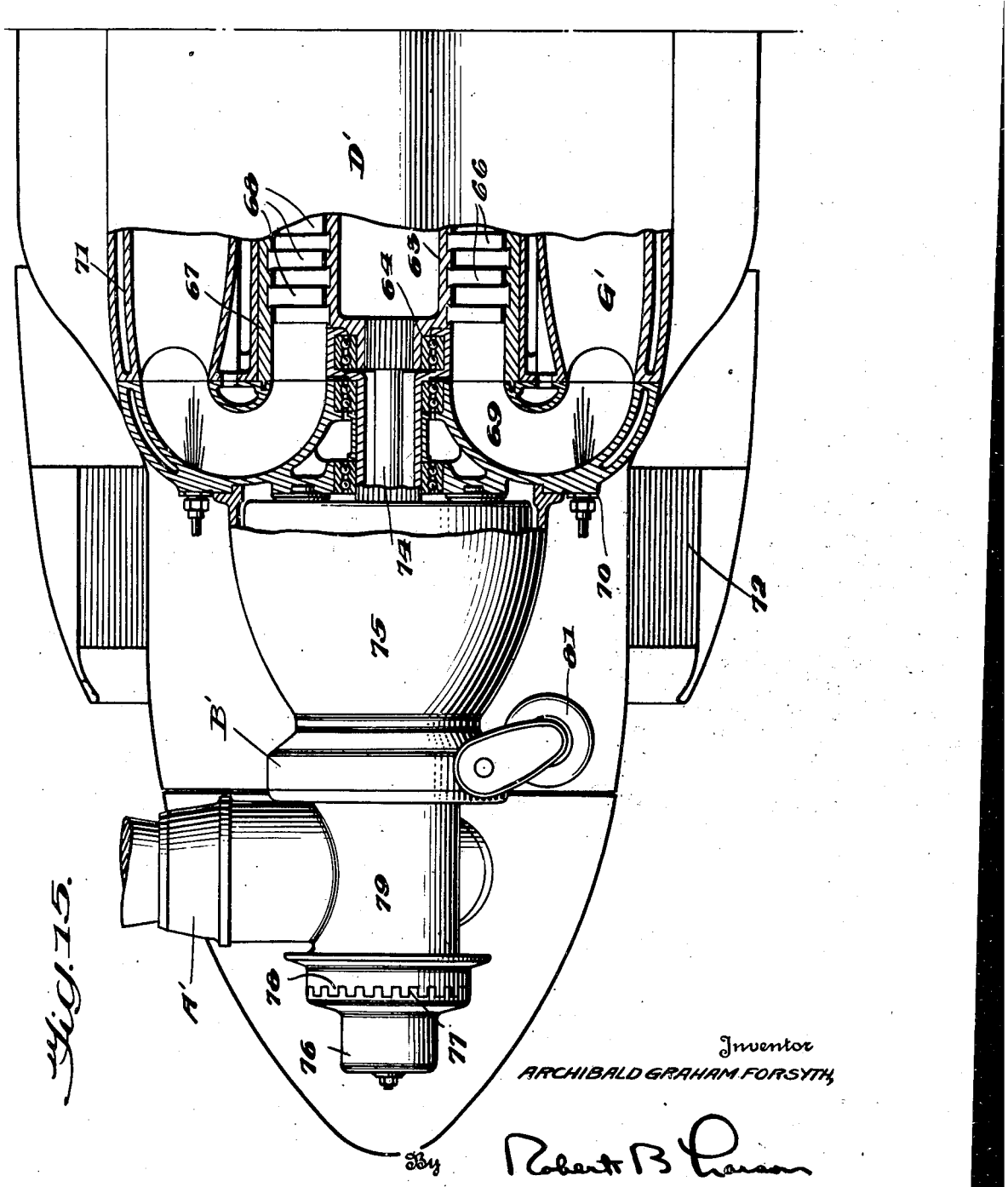

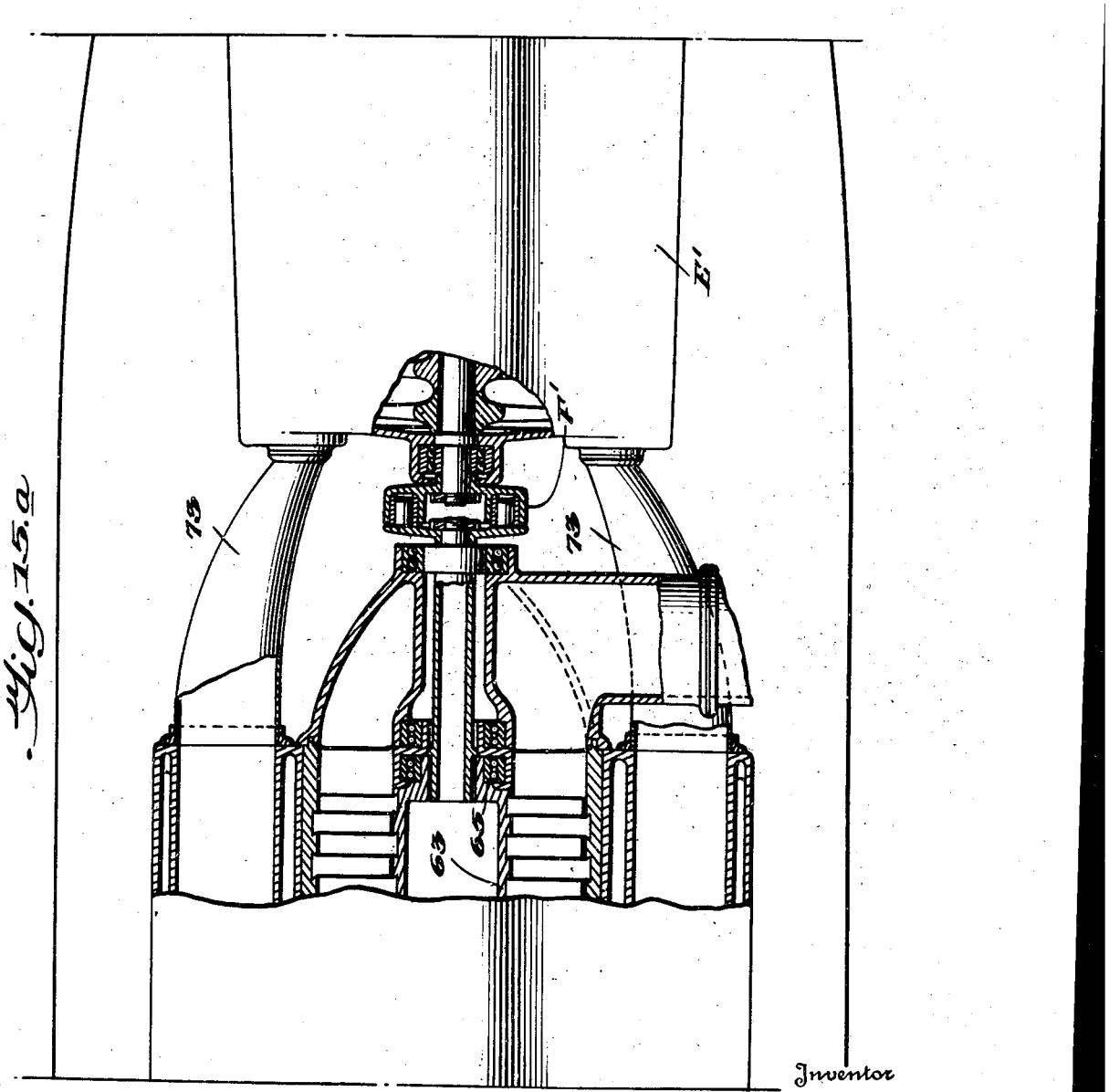

Patented June 21, 1949

2,474,143

UNITED STATES PATENT OFFICE 2,474,143

PROPULSION MEANS FOR AIRCRAFT AND THE LIKE

Archibald Graham Forsyth, Cheam, England, assignor to The Fairey Aviation Company Limited, Hayes, England Application July 13, 1944, Serial No. 544,787

5 Claims. (Cl. 170—135.71)

1

This invention relates to propulsion means for aircraft and the like, and more particularly to propulsion means which employs both jet propulsion and propeller propulsion.

In accordance with the invention a streamlined unit is provided which includes a variable pitch propeller, a clutching mechanism by which the propeller shaft may be operatively connected to the shaft of a compressor, which in turn is coupled to the shaft of a turbine. All of these mechanisms are arranged in tandem. Surrounding the compressor are a series of combustion chambers adapted to receive air from the compressor. The combustion chambers have tubular extensions which direct the exhaust gases to the turbine to drive the same. The gases pass through the turbine and are finally ejected through propulsion jets. It is a general object of the invention to provide such an arrangement.

The invention has for another object the provision, in such a system of means for cooling the turbine. It is also desirable to cool the combustion chambers.

A still further object resides in the arrangement of the different mechanism making up the unit, said arrangement being such that the unit may be readily assembled or repaired.

Another object of the invention resides in the provision of such a unit in which both the propulsion jets and the propeller may be operated simultaneously, or the propeller may be declutched and feathered so that the propulsion jets provide the sole source of propulsion.

A further object resides in the provision, in an arrangement as set forth above, of the feature of constructing the device with a common wall between the combustion chambers and the compressor.

These and other objects of the invention will become more apparent from the following description and claims when read in conjunction with the accompanying drawings in which:

Figs. 1 and 1a together comprise a side elevational view of one form of the invention, portions being shown in section;

2

Figure 1:
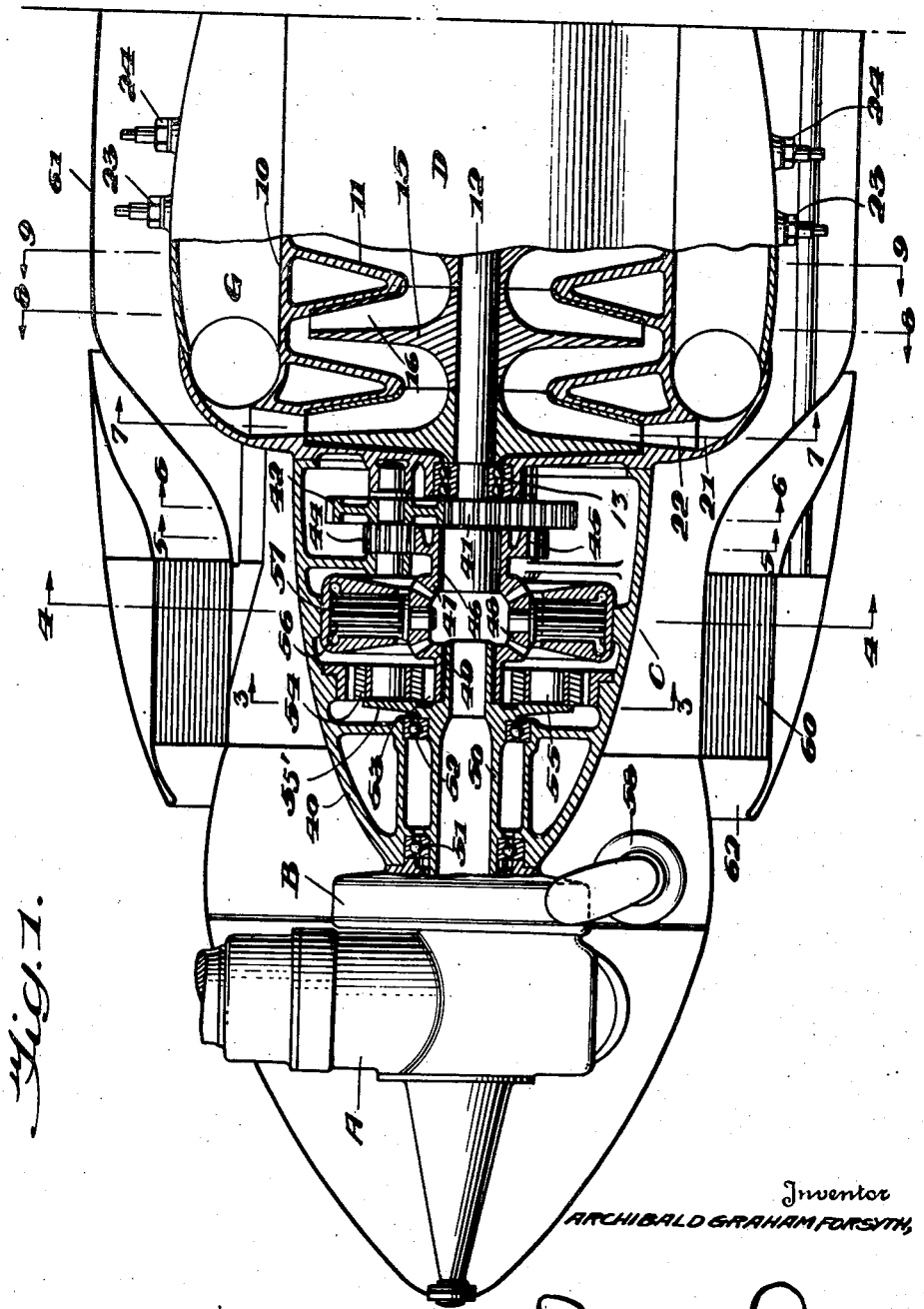
Figure 7:
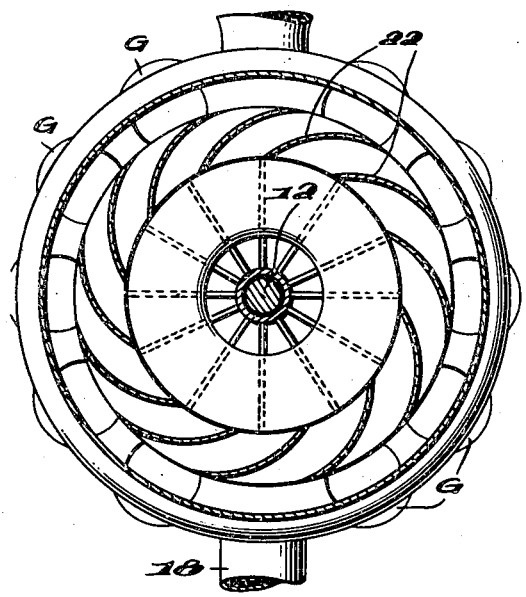
Figure 9:
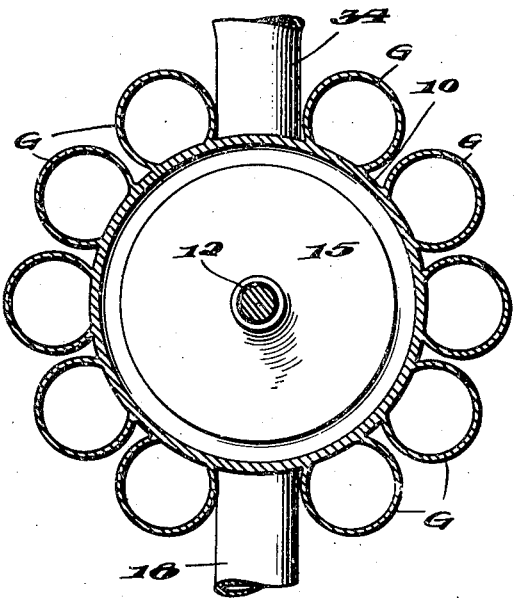
Figure 10:
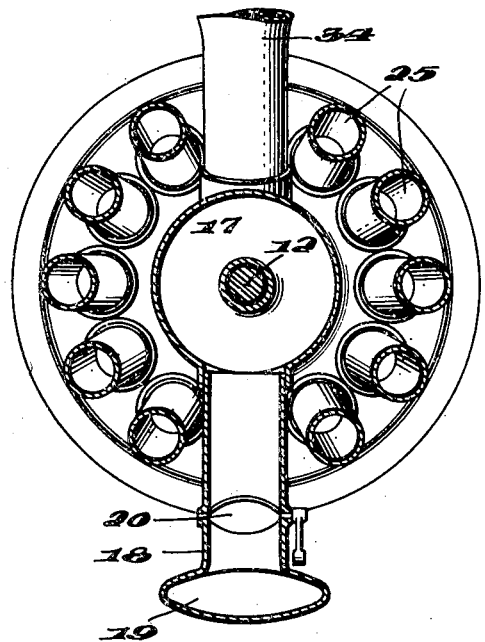
Figure 11:
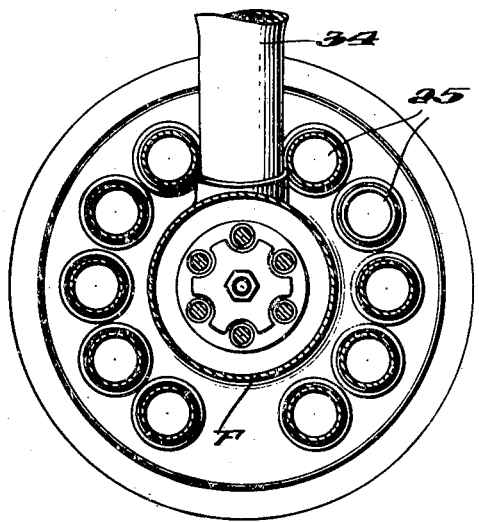
Figure 12:
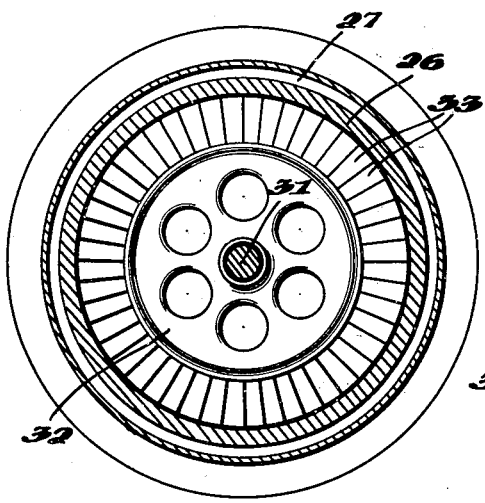
Figure 13:
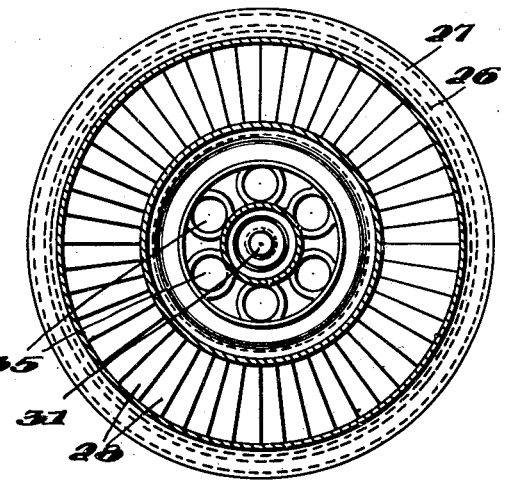
Figure 14:
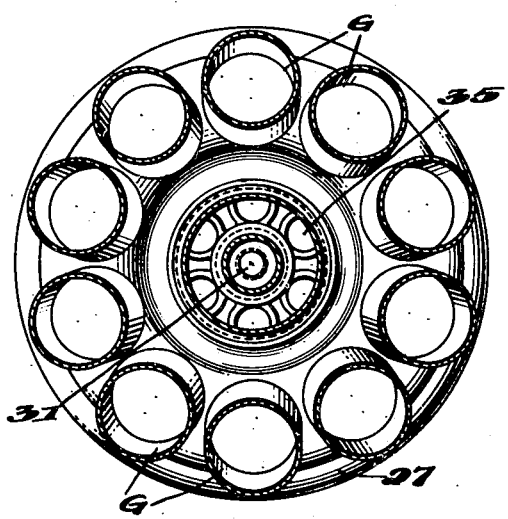
Figure 8:
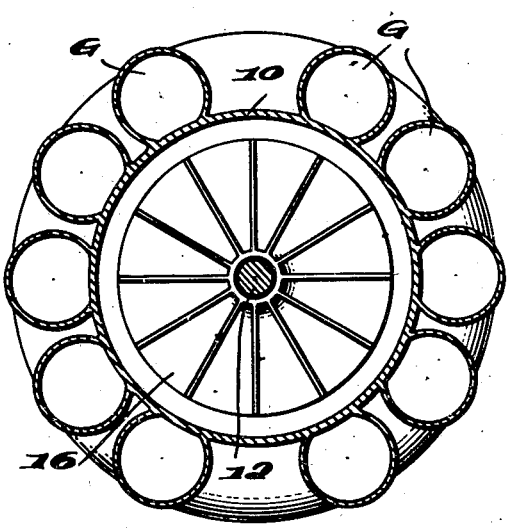

Fig. 7 is a section taken on the line 7—7 of Fig. 1;

Fig. 8 is a section taken on the line 8—8 of Fig. 1;

Fig. 9 is a section taken on the line 9—9 of Fig. 1;

Fig. 10 is a section taken on the line 10—10 of Fig. 1a;

Fig. 11 is a section taken on the line 11—11 of Fig. 1a;

Fig. 12 is a section taken on the line 12—12 of Fig. 1a;

Fig. 13 is a section taken on the line 13—13 of Fig. 1a;

Fig. 14 is a section taken on the line 14—14 of Fig. 1a; and

Figs. 15 and 15a together comprise a partial side elevational view of a modified form of the invention.

Figs. 1 and 1a together comprise a side elevational view of one embodiment of the invention, certain portions being broken away to show some of the mechanism in section. In these views the reference character A represents a variable pitch propeller, the pitch of which may be varied by a pitch changing device B. The propeller A is adapted to be clutched or declutched by a clutching arrangement C, one element of which is connected to be driven through the shaft of a compressor D as will be later described.

The letter E indicates a turbine which is joined to the compressor D by a driving connection F. The compressor D feeds air under pressure to a series of combustion chambers G, the exhaust gases of which are passed through the turbine E to drive the same. The exhaust gases then pass from the turbine E to propulsion jets H.

The compressor D is comprised of an outer cylindrical wall 10. This wall is provided with a series of evenly spaced inwardly directed annular partition members 11 which are substantially triangular in section.

A central shaft 12 is supported for rotation within the compressor wall by the bearings 13 and 14. The shaft 10 carries a series of compressor blades 15, each of which has a portion 16 extending to one side of a partition member 11 (see Figs. 8 and 9).

Air enters the compressor D at the rear through an annular chamber 17 connecting with an inlet pipe 18 having an entrant portion 19 disposed forwardly in the direction of flight. As further shown in Fig. 10, the inlet pipe 18 is provided with a valve such as the butterfly valve 20 controlled by the pilot.

The compressor D is surrounded with a series of combustion chambers G which are in fact formed so that the wall 10 is a part of each, as will perhaps be more apparent from Figs. 8 and 9. The combustion chambers G are adapted to receive air from the compressor D through the passageway 21. This passageway 21 is provided with a series of guide vanes 22 shown in Fig. 7 for guiding the air to the combustion chambers G. Fuel is injected into the combustion chambers D through suitable nozzles 23. If desired, a sparking plug 24 or the like may be employed during starting.

The combustion chambers G terminate in tubes 25 (also Fig. 11) which connect with the turbine E so as to direct the exhaust gases of combustion to the turbine blades.

The turbine E is formed of a frustoconical casing 26 provided with a cooling jacket 27. The larger end of the turbine is to the rear. The wall of the casing 26 is provided with a plurality of turbine blades 28 which extend radially inwards. These blades are evenly spaced and are disposed in the path of the incoming gases.

Mounted for rotation within the casing 26 by means of the bearings 29 and 30 is a turbine shaft 31 on which is secured a series of turbine wheels 32. These wheels 32 at their outer ends carry turbine blades 33. The wheels 32 are so spaced along the shaft 31 that their blades 33 are disposed alternately of the blades 28 in the path of the incoming gases.

The turbine wheels 32 are adapted to be cooled by means of air from the pipe 34. This pipe opens forwardly in the direction of flight and the air passing therethrough is caused to impinge on the turbine wheels 32.

At the rear of the turbine the cooling air is directed through an annular passageway 35 which joins with the passageway 36 leading to the atmosphere.

Figure 2:
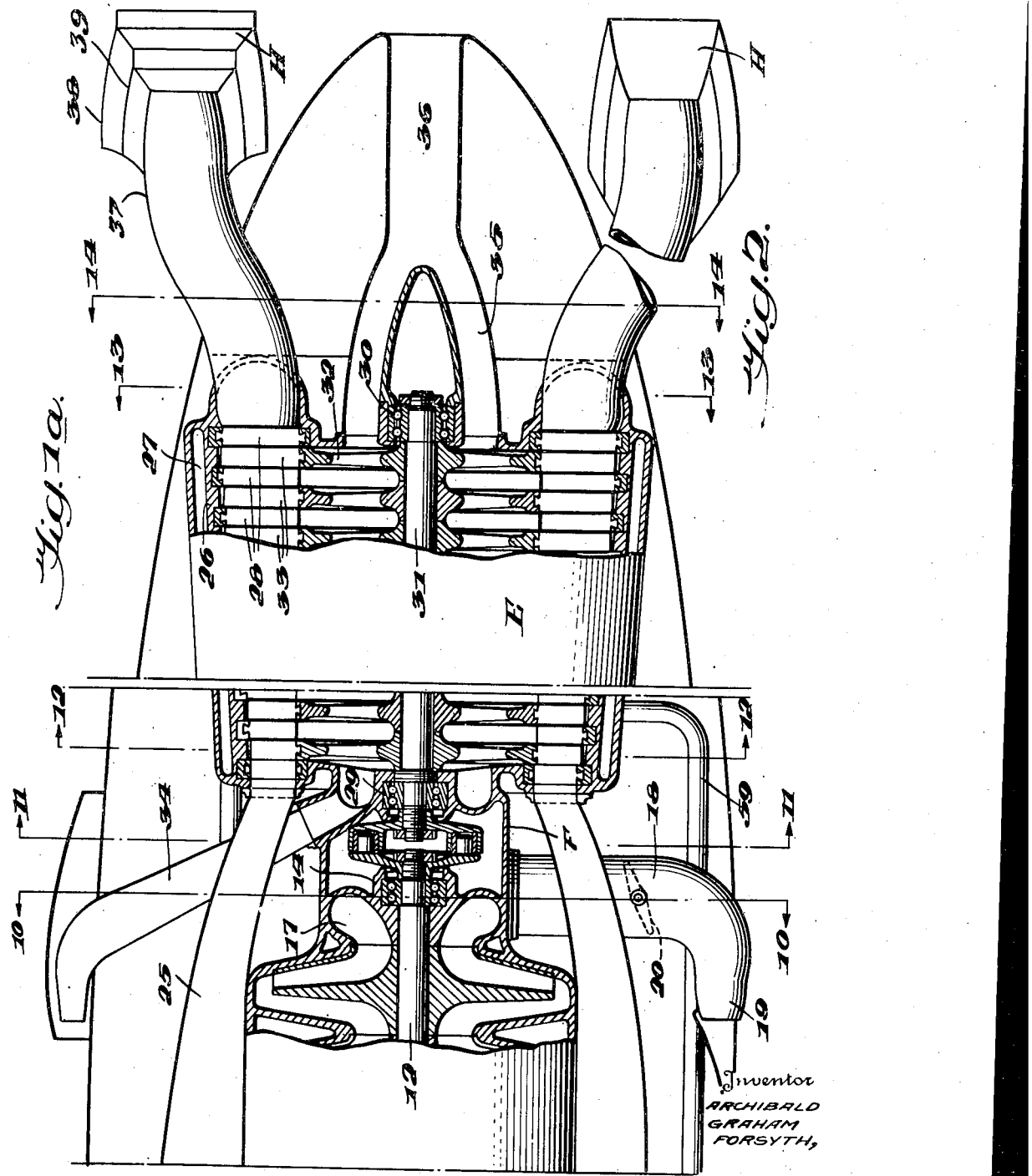
Fig. 2 is a side elevational view of a modified form of propulsion jet.

The exhaust gases from the turbine E pass through the tubes 37 to the jet nozzles H disposed on the ends of the tubes 37. The jet nozzles H are of known type which are provided with several tubular vanes 38, 39 concentrically spaced about the ends of the tubes 37. An alternative form is shown in Fig. 2.

The shaft 31 if the turbine E and the shaft 12 of the compressor D are joined by a coupling device F of known type and need not be described in detail. Its purpose principally is to facilitate alignment of the shafts and to simplify assembly of the two units. The connection is such that rotation of the turbine shaft 31, when the turbine is driven, will effect (through the coupling device F) rotation of the compressor shaft 12, thus driving the compressor D.

The clutching device C is disposed forwardly of the compressor D and is joined at one end to the front face of the compressor D and at the other end to the variable pitch mechanism B of the propeller A. Within the housing 40 of the clutching device C is the clutch itself and two sets of planetary gearing which will now be described.

Figure 6:
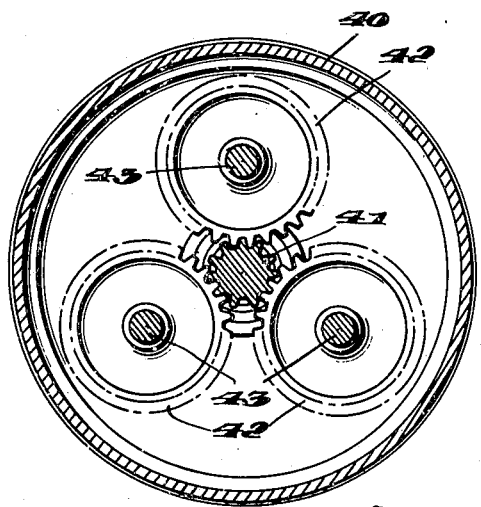
Fig. 6 is a section taken on the line 6—6 of Fig. 1.

The forward end of the shaft 12 of the compressor D is provided with a gear 41 (see Figs. 1 and 6) which engages three pinion gears 42 mounted on shafts 43 supported for rotation within the housing 40 of the clutching device.

Figure 4:
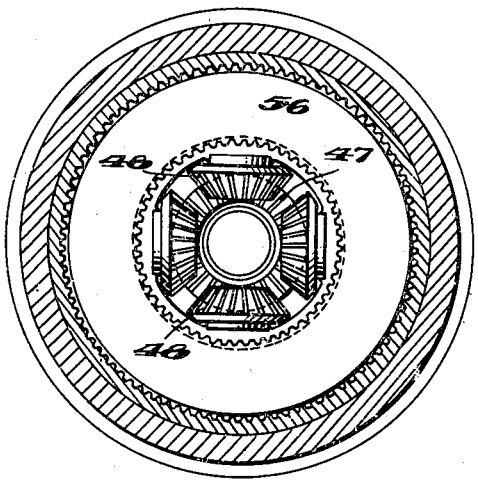
Fig. 4 is a section taken on the line 4—4 of Fig. 1.
Figure 5:
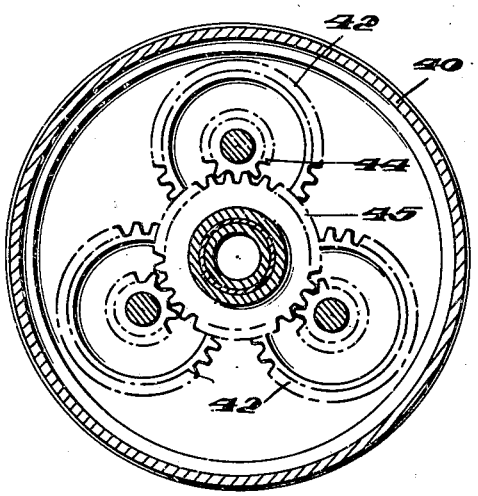
Fig. 5 is a section taken on the line 5—5 of Fig. 1.

Each of the shafts 43 is provided with a gear 44. The gears 44 engage with teeth 45 on a ring gear 46 which is in axial alignment with the compressor shaft 12. The ring gear 46 is provided also with a bevel ring gear portion 47 which engages four bevel gears 48 of the clutch (see Figs. 1 and 4). These four clutch bevel gears 48 are also engaged by a ring bevel gear 49 which is disposed as a sleeve on a drive shaft 50 for the propeller. This shaft 50 may be mounted for rotation by the bearings 51 and 52.

Figure 3:
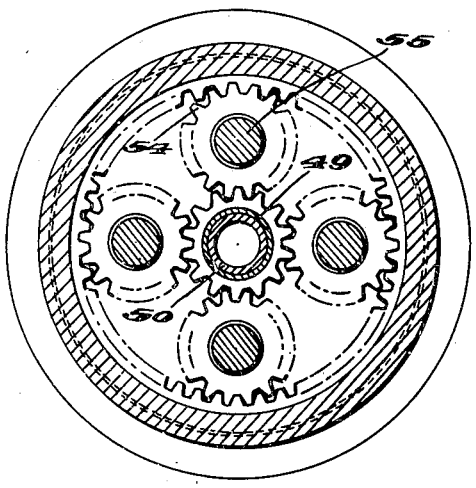
Fig. 3 is a section taken on the line 3—3 of Fig. 1.

The ring bevel gear 49 is provided also with teeth 53 engaging pinion gears 54 (see Figs. 1 and 3), which pinion gears are rotatably mounted on stub shafts 55 carried by an annular flange 55' formed on the drive shaft 50.

The clutch proper is of known type and includes a plurality of annular clutch discs 56, 57. Operating means (not shown) are provided for bringing the clutch discs into and out of frictional engagement with each other. One set of discs is secured to the bevel gears 48 so that when the discs frictionally engage each other the bevel gears 48 may not rotate on their spindles. Bevel gear 47 will then drive bevel gear 49. It is to be understood that other types of clutches may be employed.

The drive shaft 50 is connected to rotate the propeller A. The pitch of the propeller may be varied by suitable pitch changing mechanism B and driven, for example, by an electric motor 58. The pitch changing mechanism per se may be of several types and will not be here described. It may, for example, be of the type shown in my copending application Serial No. 472,882, filed January 19, 1943, now Patent 2,437,188, issued March 2, 1948.

It has previously been mentioned that the turbine E (Fig. 1a) is provided with a cooling jacket 27. A cooling medium is supplied through a pipe 59 which leads forwardly to a radiator 60 (Fig. 1) which surrounds the clutching device C. As will be seen from the drawings, the radiator 60 is shaped so as to conform to streamline contour of the fuselage 61, and is provided with an annular air passage 62 which directs cooling air against the radiating surfaces.

The operation of the device will now be apparent to those skilled in the art. The device may be started by a small electric motor or the like (not shown) which is connected to drive the shaft 31 of the turbine, and through the coupling device F also the compressor shaft 12.

Air enters the inlet pipe 18 at 19 and passes to the compressor E where it is highly compressed before passing into the combustion chambers G. Fuel is injected into the combustion chambers G through nozzles 23 and the mixture of air and fuel may be ignited by the sparking plugs 24.

The products of combustion pass rearwardly through the passageways 25 into the turbine E where they rapidly expand and then pass to the propulsion jets H. The force of the gases expelled through these jets exerts a forward propulsion effect in a manner now well known to those skilled in this art.

During operation the turbine becomes very hot and in accordance with the invention is cooled by air entering the pipe 34 and passing through the turbine to the rear, and also by cooling fluid circulating in the cooling jackets 27 and supplied from the radiator 60.

As previously indicated, operation of turbine shaft 31 also drives the compressor shaft 12, and, if the clutch device C is clutched, will also drive the propeller A. The pitch of the propellers may be varied by the pitch changing mechanism B as desired.

In Figs. 15 and 15a a modified form of device is illustrated, it being understood that the turbine E' is similar to the turbine E illustrated in Figs. 1 and 1a except that no cooling air is provided. It is clear, however, that in this modification the turbine and propulsion jets may be of the same type as shown in Figs. 1, 1a and 2.

The principal difference between the embodiments resides in the compressors. In the embodiment of Figs. 15 and 15a the compressor D' is comprised of a central hollow shaft 63 mounted in bearings 64 and 65 for rotary movement about its longitudinal axis, the shaft being connected to be rotated by the turbine E' through the coupling device F'.

The compressor shaft 63 is provided with a plurality of compressor blades 66 secured to its outer surface and extend radially outwards. These are evenly spaced along the shaft 63 and are rigidly secured thereto and rotated therewith.

The outer wall of the compressor D' is comprised of a frusto-conical tubular member 67 disposed coaxially of the shaft 63 and surrounding the same in spaced relation thereto. The inner surface of such tubular member 67 is provided with a plurality of inwardly directed radially disposed compressor blades 68. These are secured to the tubular member and are evenly spaced.

The tubular space between the compressor shaft 63 and the tubular member 67 thus comprises a compressor space in which the blades 68 remain stationary while the alternate blades 66 in the space rotate with the compressor shaft 63. It will be noted that the length of the blades 66 and 68 progressively becomes longer to conform to the frusto-conical shape of the tubular member 67.

At the forward end of the compressor D' are the curved passageways 69 leading to the combustion chambers G'. Fuel is injected into the combustion chamber by suitable means such as by the fuel jets 70. It will be noted that the combustion chambers G' in this instance is provided with a cooling jacket 71 which may be supplied with cooling fluid from the radiator 72.

The exhaust gases are expelled from the combustion chambers G' through the curved pipes 73 which direct the gases to the blades of the turbine E' to drive the same.

The forward end of the compressor shaft 63 is connected by a splined dumb-bell 74, and gearing (not shown) within the housing 75 to the propeller drive shaft. The forward end of the propeller drive shaft is provided with a clutch cap 76 having dogs 77 for engaging dogs 78 on the propeller hub 79. When the cap 76 and hub 79 are in the position shown the propeller will be rotated. The cap 76 however may be moved forwardly by hydraulic means or the like 80 and thus become declutched so that the propellers will not rotate with their drive shaft. This clutching device per se may be the same as that illustrated and described in my copending application entitled "Power unit for aircraft and the like," Serial No. 544,789, filed of even date herewith, now Patent 2,426,008, issued Aug. 19, 1947.

As in the embodiment of Figs. 1 to 14, inclusive, propeller A' is of the variable pitch type having pitch changing mechanism B' adapted to be actuated by an electric motor 81 or the like.

The operation of this embodiment is generally similar to that described, the principal difference, as indicated, residing in the form of compressor.

It will be noted that in both embodiments, the propellers may be clutched to be driven by the turbine so that aircraft will be propelled both by the propeller and by the propulsion jets. For flying at high altitudes, the propellers may be declutched and feathered so that the propulsion jets alone will drive the aircraft.

It should be manifest that some changes in structure and arrangement may be made within the scope of the invention, which is only to be limited to the extent indicated in the following claims.

What I claim is:

1. In a device of the type described comprising, a variable pitch propeller, a compressor, a turbine, clutching means for operatively connecting the propeller with the shaft of said compressor, and a driving coupling connecting the shafts of said compressor and said turbine; that improvement which comprises mounting said propeller, clutching means, compressor, driving coupling and turbine in tandem along a longitudinal axis coincident with the shafts of the propeller, compressor and turbine, a series of elongated combustion chambers surrounding said compressor and having a common wall therewith, said combustion chambers extending rearwardly and being joined to said turbine to deliver exhaust gases thereto, and a plurality of propulsion jets disposed rearwardly of the turbine and connected to receive exhaust gases passing through the turbine.

2. In a device of the type described comprising, a variable pitch propeller, a compressor, a turbine, clutching means for operatively connecting the propeller with the shaft of said compressor, and a driving coupling connecting the shafts of said compressor and said turbine; that improvement which comprises mounting said propeller, said clutching means, said compressor, said driving coupling and said turbine in tandem along a longitudinal axis coincident with the shafts of the propeller, compressor and turbine, a series of elongated combustion chambers surrounding said compressor and having a common wall therewith, said combustion chambers extending rearwardly and being joined to said turbine to deliver exhaust gases thereto, and a plurality of propulsion jets disposed rearwardly of the turbine and connected to receive exhaust gases passing through the turbine, means for introducing air to said compressor at the rear end therof, the inlet end of said combustion chambers being adjacent the front end of said compressor.

3. In a device of the type described comprising, a propeller, a compressor, a turbine, and coupling means drivingly connecting the shafts of said compressor and said turbine; that improvement which comprises mounting said turbine, said compressor, and said propeller so that the shafts thereof have a common longitudinal axis, a series of combustion chambers surrounding said compressor and connected to be fed thereby, means connecting said combustion chambers with said turbine to supply the exhaust gases thereto, a plurality of propulsion jets connected with said turbine to receive exhaust gases therefrom, means between the compressor and propeller for clutching the shaft of the compressor with the shaft of the propeller, at least one passageway having an inlet disposed in the direction of flight and connected to deliver cooling air to the turbine to cool the same, said turbine having a cooling jacket, a radiator for a cooling medium disposed to surround said clutching mechanism, and means connecting said radiator and said cooling jackets.

4. In a device as defined in claim 3, and a cooling jacket for said combustion chambers connected to said radiator.

5. In a device of the type described comprising, a propeller, a compressor, a turbine, and coupling means drivingly connecting the shafts of said compressor and said turbine; that improvement which comprises mounting said turbine, said compressor, and said propeller so that the shafts thereof have a common longitudinal axis, a series of combustion chambers surrounding said compressor and connected to be fed thereby, means connecting said combustion chambers with said turbine to supply the products of combustion thereto, a plurality of propulsion jets connected with said turbine to receive exhaust gases therefrom, means between the compressor and propeller for clutching the shaft of the compressor with the shaft of the propeller, said turbine having a cooling jacket, a radiator for a cooling medium surrounding said clutching mechanism, and means connecting said radiator and said cooling jacket.

ARCHIBALD GRAHAM FORSYTH.

REFERENCES CITED

The following references are of record in the file of this patent:

UNITED STATES PATENTS

| Number    | Name          | Date          |
|-----------|---------------|---------------|
| 1,828,782 | Morton et al. | Oct. 27, 1931 |
| 2,050,349 | Lysholm et al.| Aug. 11, 1936 |
| 2,243,467 | Jendrassik    | May 27, 1941  |
| 2,256,198 | Hahn          | Sept. 16, 1941|
| 2,306,953 | Jung          | Dec. 29, 1942 |
| 2,396,068 | Youngash      | Mar. 5, 1946  |
| 2,399,046 | Larrecq       | Apr. 23, 1946 |
| 2,434,134 | Whittle       | Jan. 6, 1948  |

FOREIGN PATENTS

| Number  | Country       | Date         |
|---------|---------------|--------------|
| 495,469 | Great Britain | Feb. 8, 1937 |